United States Patent

Mizobuchi et al.

[11] Patent Number: 6,103,782
[45] Date of Patent: Aug. 15, 2000

[54] METHOD OF MAKING DRY PIGMENT SURFACE MODIFIED WITH POLYETHYLENE COATING

[75] Inventors: Yoshikazu Mizobuchi, Des Plaines; Robert Freed, Lincolnwood, both of Ill.

[73] Assignee: Marconi Data Systems, Inc., Wood Dale, Ill.

[21] Appl. No.: 08/688,146

[22] Filed: Jul. 29, 1996

[51] Int. Cl.[7] .................................................. C08K 9/00
[52] U.S. Cl. ......................... 523/205; 523/206; 428/407
[58] Field of Search .................... 523/205, 206; 428/407

[56] References Cited

U.S. PATENT DOCUMENTS

| | | | |
|---|---|---|---|
| 3,409,585 | 11/1968 | Hagemeyer, Jr. et al. | 260/41 |
| 3,683,678 | 8/1972 | Yau | 73/53 |
| 3,904,562 | 9/1975 | Hopfenberg et al. | 260/22 CB |
| 4,175,979 | 11/1979 | Robertson et al. | 106/309 |
| 4,729,796 | 3/1988 | Deubel et al. | 106/309 |
| 4,919,922 | 4/1990 | Miyoshi et al. | 424/63 |
| 5,401,780 | 3/1995 | Bugnon et al. | 523/206 |
| 5,543,219 | 8/1996 | Elwakil | 428/402.24 |

FOREIGN PATENT DOCUMENTS

| | | |
|---|---|---|
| 479669-A1 | 4/1992 | European Pat. Off. . |
| 1477150 | 6/1977 | United Kingdom . |
| WO 96/19542 | 6/1996 | WIPO . |

*Primary Examiner*—James J. Seidleck
*Assistant Examiner*—U. K. Rajguru
*Attorney, Agent, or Firm*—Leydig, Voit & Mayer, Ltd.

[57] ABSTRACT

Dry, coated pigment particles are obtained by first suspending uncoated pigment particles in an appropriate medium and then coating the particles while in suspension, with a polymer that is at or above the softening point for that polymer. Coating of the pigment particles is achieved by allowing the suspension to cool to a temperature below the solidification temperature for the polymer. The coated pigment particles are then recovered.

7 Claims, No Drawings

6,103,782

METHOD OF MAKING DRY PIGMENT SURFACE MODIFIED WITH POLYETHYLENE COATING

FIELD OF THE INVENTION

This invention relates generally to the field of pigments, and in particular to pigment particles that have been modified to enhance their use in various formulations, such as inks, paints, coatings and the like.

BACKGROUND OF THE INVENTION

Polyethylene and oxidized polyethylene have been used in oil based coating systems to make coated pigment particles in flushes or ink concentrates from uncoated pigments that originate in a dry form, as a presscake or as a slurry. European patent WO93/23795 discloses a method for using such polymers as part of a coating system to coat the surface of magnetic and carbon black pigments in oil systems. There is no teaching regarding the manufacture of dry, coated particles, however. Such dry pigment particles would allow the user wider latitude to develop formulations containing the pigment particles than does a presscake or slurry.

Although there theoretically are many ways to prepare a polymer coated pigment in dry form, many such techniques require a high power grinding process to make the particle size small enough. Such a technique causes secondary agglomeration of the pigments because of the adhesion generated by the heat, such as grinding energy, between the polymer coated surfaces.

Accordingly, a need exists for dry pigments that have one or more of the following properties: (1) exhibit a small particle size distribution, (2) have a high dispersibility in low polar solvents, including oils and varnishes, (3) require little or no grinding energy, (4) have high chemical resistance and high color strength, and (5) can be manufactured in an environmentally safe manner.

SUMMARY OF THE INVENTION

In accordance with the present invention, dry, coated pigment particles may be obtained. In each of the several embodiments of the present invention, the desired pigment particles are first suspended in an appropriate medium and then coated while in suspension, with a polymer that is at or above the softening point for that polymer. Coating of the pigment particles is achieved by allowing the suspension to cool to a temperature below the solidification temperature for the polymer while maintaining the pigment particles in suspension. The medium is then removed from the surface of the particles and the coated pigment particles are then recovered by any of several techniques.

If the pigment particles are coated in an oil suspension, the oil may be removed by washing with an appropriate volatile solvent, followed by drying.

If the pigment particles are coated in an organic suspension or a mixed aqueous organic suspension, the solvent that is used to form the suspension may be removed directly by drying or may be replaced by solvent washing with a more volatile solvent that then may be removed by drying.

Similarly, if the pigment particles are coated in an aqueous suspension, the water that is used to form the suspension may be removed directly by drying or may be replaced by solvent washing with a more volatile solvent that then may be removed by drying.

Pigments, in any form, such as slurry, presscakes or dry, can be used as sources for use in the present invention. The coated pigments that result from the present invention require little or no grinding energy to be finely powdered. The coated pigments disperse well in low polar organic solvents, vegetable oils, common drying oils, naphthenic oils and paraffinic oils. The treated pigments are available in presscake form.

DESCRIPTION OF THE PREFERRED EMBODIMENTS PIGMENTS

The pigments that are of use in the present invention include but are not limited to the following:

Metallized Azo Reds: Red 49:1 (Barium salt), Red 49:2 (Calcium salt), Red 63:1 (Calcium salt)
Toluidine reds
Naphthol reds
Pyrazolones
Rhodamines
Quiacridones: Red B, Red Y, Magenta B, Magenta and violet
Phthalocyanine blues, including copper phthalocyanine blue
Alkali Blue
Phthalocyanine greens
Carbazole violets
Monoarylide Yellow
Diarylide Yellow
Chrome yellow
Red Lake C
Lithol reds: calcium and barium salts
Lithol rubine
Bon Maroon
Perylene pigments
Red 2B: Calcium, Barium and Magnesium salts
Chrome Yellow
Chrome Orange
Molybdate orange
Orange 36, Diarylide orange, Dianisidine
orange, tolyl orange and Dinitraniline orange
Carbon Black
Titanium dioxide Such pigments may have a wide range of particle sizes, as from about 0.02 $\mu$m to about 100 $\mu$m, preferably from about 0.04 $\mu$m to about 5 $\mu$m, and more preferably from 0.05 to 2 $\mu$m.

POLYMER COATING

Preferably, the coating polymer is a polyethylene, most preferably an oxidized polyethylene homopolymer. Other useful polymers include other polyolefins, which may also be modified to have surface active groups such as hydroxyl, carboxyl, amino, ammonium, carboxylate ion or nitro groups, or the like. Most preferably, the polymer will have an acid value from about 0 to about 50. Useful polymers include those available from Allied Signal under the trademarks AC 6, 7, 8, 9, 15, 16, 316, 316A, 325, 330, 392, 395, 395A, 400, 405, 430, 617, 629, 629A, 655, 656, 680, 712, 715, 725, 735, 1702 and 6702, especially AC 656 and 6702.

It is believed that low molecular weight polymers are preferable in most instances. If the chain length of the polymer is too long, it is possible that the dispersing polymer will interact physically with more than one particle, thus causing undesired agglomeration of the particles. Accordingly, for example, the molecular weight may range from about 100 to about 50,000, usually up to about 20,000, typically up to about 10,000, and more typically up to about 5,000, at least when oxidized polyethylene is used as the dispersing polymer. The molecular weight used can vary, of course, depending upon the particular components used in the formulation.

THE OIL

If an oil is used as the organic solvent, the oil may be any suitable hydrocarbon that will act as a good dispersion medium in its heated state. The oil should have high oxidation stability. In one embodiment, the oil is preferably a vegetable oil, especially soya oil. Other suitable oils include linseed oil or any other vegetable oil (cotton seed, china wood, and the like). Common derivatives of such oils, such as wholly or partially hydrogenated oils or derivatives of such oil may be used. Both raw and treated oils are applicable to the current invention.

In another embodiment, the oil may be a naphthenic or paraffinic oil. Vegetable oils may be used in combination with the napththenic and paraffinic oils.

THE ORGANIC MEDIA

Any of a wide variety of organic media may be used for purposes of the present invention. An organic solvent may be used alone or in combination with water, depending upon the pigment condition before the surface treatment is carried out, such as slurry form in water, presscake form or dry form. The coating environment of the pigments started from a slurry (water) or presscake is a mixture of organic solvent (s) and water. Dry pigments require organic solvent(s) for the treatment. The boiling point of the coating solvent should be higher than softening point of the coating material. Any type of organic solvents are available for the treatment, if they meet the requirement described above.

THE WASHING SOLVENT

Organic solvents that have relatively low boiling points around 100° C. or less are typically used as the solvent for washing, such as for washing oil from the surface of the treated pigment. Such solvents include tetrahydrofurfuryl alcohol, tetrahydrofurfuryl (THF), toluene, ethyl acetate, methanol, n-propanol, hexane, cellosolve acetate or alcoholether, such as Dowanol, or hydrocarbon, such as Isoper G. After washing the oil off by use of such solvent, if the chosen solvent has a higher boiling point, it may be desirable to replace such an organic solvent with a solvent that has a lower boiling point, such as with n-propanol or ethanol.

THE RESINS

The resins that may be used in the present invention include rosin esters, terpene resins, acrylic resins, polyolefins, polyesters, polyamides and polyurethanes, and the like, as well as copolymers, and graft polymers of the aforementioned, all of which may also be modified to have surface active groups such as hydroxyl, carboxyl, carbonyl, amino, carboxylate ion, ammonium, or nitro groups or the like.

AREA OF APPLICATION

The present invention is useful for making coated pigment particles that may find use in a wide variety of applications, such as ink for ink jet (continuous and drop-on-demand systems, dry jet ink (solid ink for ink jet), thermal ink ribbon, oil based ink, solvent based ink, presscake for inks, toner for xerography, coloring material for fabrics, coloring material for plastics and display panels, and the like.

EXAMPLES

The present invention is further illustrated by the following non-limiting examples.

PROCESS EQUIPMENT

In the examples that follow, the equipment utilized to perform the examples was as follows, unless otherwise indicated.

A 1.2 L stainless steel container equipped with a disperser from Premier Mill Corp., Laboratory Dispersator, Series 2000, Model 90 (one horse power with a 2.5 inch blades) and a hot plate was used for the processes that involved water or mixture of organic solvent(s) and water as the solvent(s).

A 0.5 L stainless steel container equipped with a stirrer and hot plate was employed for oil based coating system used to coat dry pigments.

A mixer from Charles Ross and Son Company, Model LDM-1QT, equipped with a heater and a vacuum pump was used for preparing ink concentrates from dry coated pigments with varnish as well as from coated pigment in presscake form by flushing water with the varnish.

PARTICLE SIZE DISTRIBUTION ANALYSIS

A laser beam scattering particle size analyzer from HORIBA, Model LA-900, was used for the particle size distribution study on the surface treated dry pigments which were redispersed in solvent(s). Ethanol or a mixture of ethanol and organic solvent(s) was chosen for the analysis in the analyzer.

DETERMINATION OF SURFACE COATING MATERIAL(S) ON PIGMENTS

A $^{13}$C MAS (Magic Angle Spinning) NMR spectrometer from Bruker (ASX NMR Spectrometer) was used to determine the existence of the surface coating material(s) on pigments.

PIGMENTS FOR SURFACE TREATMENT

Three presscakes, Copper Phthalocyanine Blue G/S (BL2101-PC), Lithol Rubine (LR5133-PC) and Diarylid Yellow (YA1933-PC) from Magruder Color Co. Inc., were used, as indicated in the example. A presscake, Alkali Blue (NB D6152), from BASF, was also used as indicated in the examples.

Copper Phthalocyanine Blue dry pigment and Sunfast Blue 2492083, from Sun Chemical, and Carbon Black, Elftex-8 and Monarch 120, are from Cabot Corporation, Special Black Division, were also used as indicated in the examples.

SURFACE COATING AGENTS AND SOLVENTS

All surface coating agents are from Allied Signal and all solvents are from Aldrich Chemical Company.

SURFACE COATING PROCEDURES

1-A. Treatment without resin(s) in Oil(s)

A slurry (20 weight percent of pigment) was constituted from dry pigment and soy oil in the 1.2 L stainless steel container with stirring at 1000 rpm above the melting point of the polymer, AC 316 (high density oxidized polyethylene) for 20 minutes. Then AC 316, surface coating material, was added with stirring at the same speed. It was kept at that temperature for approximately 30 minutes and then cooled in air with stirring at 500 rpm.

1-B. Treatment with resin(s) in Oil(s)

An oil based paste (40 weight percent of pigment) with resins was prepared in a 0.5 L stainless steel container with stirring. Heat was applied to dissolve the resins and an oxidized polyethylene, AC 656, and the dry pigment was added in the varnish with stirring at around 500 rpm. It was kept at the elevated temperature for 20 minutes and then cooled in air, with stirring.

2. Treatment in mixture of organic solvent and water

A slurry (10 weight percent pigment) was reconstituted from a presscake in the 1.2 L stainless steel container, with stirring at 1000 rpm for 20 minutes. Then xylene that was ⅙ of total water content in the slurry was added slowly, with stirring at 500 rpm. A phase separation was observed after about 5 minutes. The pigment then was transferred to the xylene rich phase with additional water.

The xylene paste, which was of 20 grams of the pigment as dry weight, dispersed in 300 grams of xylene was placed in the container, with the disperser at 1000 rpm for 20 minutes. Then the slurry was heated at 80° C. and the coating material, AC 656 or AC 6702, was added with high dispersion at 2000 rpm. The slurry was kept at 80° C. for 20 minutes and then was cooled in air, with stirring at 1000 rpm.

A slurry (15 weight percent pigment) was reconstituted with xylene from dry pigment in the container at 60° C. with stirring at 1000 rpm for 30 minutes. The preceding procedure was then followed as described above.

3. Treatment in water

3-A. A slurry (5 to 10 weight percent pigment) was reconstituted from a presscake (20 grams to 40 grams of pigment, an dry weight) with water in the container. The slurry was mixed well with the disperser at approximately 1000 rpm for 20 minutes. The slurry then was heated up to 60° C., with stirring at the same speed, and a coating material, AC 6702 (oxidized polyethylene wax), or AC 1702 (polethylene wax) was added with high shear dispersing conditions at 2000 rpm. The slurry was kept at 60° C., for 30 minutes and then allowed to cool in air with stirring at 1000 rpm.

3-B. A slurry (15 weight percent pigment) was reconstituted from dry pigment (60 grams of pigment, as dry weight) with water in the container. The slurry was mixed for 30 minutes at 60° C. with high shear dispersing conditions around 2000 rpm. A coating material, AC 6702, was added without changing the conditions. The slurry was kept at 60° C. for 30 minutes and then allowed to cool to room temperature, in air, with stirring at 1000 rpm.

WASHING PROCESS FOR OIL(S)

After the coating process was done for pigments in oil(s), organic solvent(s) that have relatively low boiling point(s) around 100° C. were chosen for the oil(s) washing. An oil paste or ink concentrate, approximately 5 grams, was placed in a 200 ml beaker and the solvent, approximately 50 ml, was added. The beaker was sonicated in an ultrasonic bath until the sample was completely dispersed. The pigment, with the coating material and resins, was separated from a mixture of the oil(s) and the solvent, centrifugally. The recovered pigment with coating material and resins was placed in a 200 ml beaker with the solvent, approximately 50 ml and sonicated until the sample was completely dispersed. The pigment was separated from the mixture of the oil(s) and the solvent centrifugally. These processes were repeated several times until the color of the supernatant in a centrifuge tube became colorless. The centrifugally separated pigment then was moved in a aluminum cup and air-dried from overnight to 3 days.

DRYING PROCESS

After washing oil(s) off by solvent(s), replacing organic solvent(s) which have high boiling point(s) with n-propanol or ethanol, or adding ethanol to the water based slurry, or with no further solvent treatment, the coated pigments were dried in air at room temperature, or in a drying oven at 40° C. overnight.

PULVERIZING PROCESS

An electric coffee grinder as used for home use, was used to pulverize the dried, coated pigments, for 30 seconds.

PREPARATION OF PIGMENT DISPERSION

An approximate 1 weight percent pigment dispersion was prepared in a 20 ml glass vial. The dispersion was sonicated for 20 minutes. Solvents used for the pigment dispersions were water, ethanol, methylethylketone (MEK), toluene and soy oil. An acid fountain solution (pH: 4.64) and an alkaline aqueous solution (pH: 11) were also chosen for this preparation.

TESTING PROCEDURE OF STABILITY OF PIGMENT DISPERSION

After preparation, as described above, the dispersions were kept still on an experimental bench for 24 hours and the stability of the pigment dispersions was evaluated by observing the amount of settled pigment and the color of the supernatants. The dispersions were classified by four degrees of stability, as shown in Table 1.

TABLE 1

| Explanation of Degree of Pigment Dispersion Stability | |
|---|---|
| Degree of Stability | Explanation |
| E | Suspended very well with no settling |
| G | Suspended well with a little settling |
| P | Poorly suspended with a large settling |
| VP | Totally settled |

PREPARATION OF PRESSCAKE MADE FROM POLYMER COATED PIGMENT

Presscakes were prepared by filtration of the polymer coated pigments in water-based slurries.

EVALUATION OF WATER CONTENT IN PRESSCAKE

About 2 grams of the presscake was weighed in an aluminum cup and was set in a drying oven at 110° C. for 18 hours to 24 hours. The water content was calculated from its weight loss.

EVALUATION OF PIGMENT FOR CHEMICAL RESISTANCE

The polymer coated dry pigment was mixed with the acid fountain solution and the alkaline aqueous solution individually in 20 ml glass vials to constitute about 1 weight percent dispersions. They were sonicated for a few minutes and kept still at room temperature for 24 hours. The color of the supernatants then was evaluated as being the chemical resistance. A stronger color showed poor chemical indicative of resistance, as being directly related to "bleeding" of an ink caused by a fountain solution during a printing process. This is important test for ionic pigments, such as Lithol Rubine and Alkali Blue.

EVALUATION OF PIGMENT IN OIL BASED INK

The polymer coated dry copper phthalocyanine blue pigment was mixed by hand with a varnish as shown in Table 3, at a ratio of 40/59 (pigment/varnish), by weight, to make an ink concentrate. The mixture was set in a mixer from Charles Ross and Son Company, Model LDM-1QT, equipped with a heater and mixed at 70.28 rpm for 30 minutes at 40° C. After the ink concentrate was allowed to cool, at room temperature, one part of an anti-oxidant (10 weight percent of BHT in Aged Linseed Oil) was added and mixed at the same speed for 10 minutes.

TABLE 2

Ingredients of Varnish*

| Ingredients | Weight Percent |
|---|---|
| Aged Linseed Oil | 71.43 |
| Pentrex 859HV | 22.86 |
| from Harcules | |
| Acryloid-R DM-55 | 5.71 |
| from Rhom and Haas | |
| Total | 100.00 |

*The varnish was prepared in nitrogen atmosphere.

The ink concentrate was mixed by hand with a heat set let-down varnish as shown in Table 3 a ratio of 42/58 (ink concentrate/varnish), by weight, to prepare a heat set ink. The ink was mulled 200 revolutions with a 10 LB weight by using a Hoover Automatic Muller Model M5 from Hoover Muller Color Corporation.

TABLE 3

Formulation of Heat Set Let-down Varnish

| Ingredients | Weight Percent |
|---|---|
| Exoset HS-126-G* | 65.5 |
| Exoset Q.S. 128 FF* | 10.3 |
| Capsule Softening | 5.2 |
| Vehicle NVFG-380* | |
| Poly/PTFE Compound | 5.2 |
| from Lawter | |
| International Inc. | |
| Exoset FF Varnish | 12.1 |
| X-200-82A* | |
| COVI-OX T-70 | 1.7 |
| from Henkel Corp. | |
| Total | 100.0 |

*From Walsh Manufacturing Company.

An off-set color swatching press from Little Joe Color Swatcher Inc., was employed for printing inks on sheets of coated stock paper. They were heatset at 250° F. by using a heater from SQG Industries. Five samples were prepared for each ink.

The color quality of the inks, such as L, a and b values, was measured by using a spectrophotometer from Hunter Lab, Model 45/0 Color Quest. The gloss of the printed ink was evaluated by using a gloss meter from Hunter Lab (ProGloss) at 60 degree. A densitometer from Macbeth, Model RD918, was employed to measure the density of the samples. All data were the average of the five printed samples.

A Laray viscometer was employed for the rheological analysis of the heatset inks, such as Viscosity, Yield Value and Shortness Factor.

Examples 1–12

Evaluation of washing solvents for surface coated Copper Phthalocyanine Blue without/with resins in oil(s) based on the procedures of "Surface Coating Procedures", 1-B and 1-A Oxidized polyethylene coated dry pigments were prepared in accordance with general procedures 1-B and 1-A, in which 4 weight percent of AC 656 or AC 316 oxidized polyethylene was used, with or without additional resins, respectively, in oil(s). The resins used were a mixture of resins, Pentrex 1100 (phenol modified ester of rosin) and Acryloid-R DM-55 (acrylic resin), at a weight ratio of 4:1, respectively.

The effect of various washing solvents to remove the oil from the coated pigment particles was evaluated. The affect of the solvents was evaluated to determine which washing solvents kept the coating material, with or without resins, on the pigment surface, and maintained the small pigment particle size, when the pigments were re-dispersed.

Table 4 shows the dependency of the solvent used for washing, to the pigment particle size for the coated pigment, made with resins in accordance with procedure 1-B. Because the measurements were carried out in ethanol as a solvent for the HORIBA particle analyzer, the results may not be reflective of the correct particle size distribution.

TABLE 4

(Examples 1–6)
Washing Solvent Dependency - AC 656 (4 wt. %) Coated Copper Phthalocyanine Blue pigment with resins in aged linseed oil

| Solvent | Median Diameter (micrometer) | Standard Deviation (micrometer) | Remarks |
|---|---|---|---|
| THF Alcohol | 0.169 | 0.137 | Bimodal |
| Toluene | 0.199 | 0.206 | Bimodal |
| Ethyl Acetate | 0.169 | 0.133 | Bimodal |
| Methanol | 0.099 | 0.172 | Bimodal |
| n-Propanol | 0.534 | 0.029 | Single |
| Hexane | 0.221 | 0.249 | Bimodal |

All solvents resulted in particles that have a high level of compatibility to aged linseed oil. Although some of the solvents dissolve the auxiliary resins, for example THF alcohol and toluene, none dissolved the oxidized polyethylene. The dependency of the solvent used for washing to the particle size distribution was observed easily. Alcohols tended to keep the pigment particle size small: for example, the pigment washed with n-propanol had a single distribution around 0.534 micrometer.

Table 5 shows the dependency of the solvent used for washing to the pigment particle size for the coated pigment made in accordance with procedure 1-A, without auxiliary resins, and using 4 weight percent of AC 316 oxidized polyethylene, based on the weight of the pigments.

TABLE 5

(Examples 7–12)
Washing Solvent Dependency - AC 316 (4 wt. %) coated Copper Phthalocyanine Blue pigment without resin in soy oil

| Solvent | Median Diameter (micrometer) | Standard Deviation (micrometer) | Remarks |
|---|---|---|---|
| THF Alcohol | 0.182 | 0.239 | Bimodal |
| Toluene | 0.182 | 0.359 | Bimodal |
| Ethyl Acetate | 0.176 | 0.263 | Bimodal |
| Cellosolve Acetate | 0.160 | 0.105 | Bimodal |
| n-Propanol | 0.230 | 0.749 | Broad |
| Hexane | 0.245 | 0.478 | Trimodal |

From the foregoing, it appears that cellosolve acetate worked better than the other washing solvents.

Examples 13–14

Stability of dispersion of oxidized polyethylene coated, dry Copper Phthalocyanine Blue pigment, washed with n-propanol The stability of a dispersion is due, at least in part, to the affinity of the pigment surface to the dispersant medium. This Example evaluates the compatibility of two coated pigments with various media.

Oxidized polyethylene coated dry pigments were prepared in accordance with general procedures 1-B and 1-A, in which 4 weight percent of AC 656 or AC 316 oxidized polyethylene was used, with or without additional resins, respectively, in oil(s). The resins used were a mixture of resins, Pentrex 1100 (phenol modified ester of rosin) and Acryloid-R DM-55 (acrylic resin) at a weight ratio of 4:1, respectively. The particles were washed with n-propanol, and dried, to obtain dry, coated pigment particles. The dry, coated pigment particles were dispersed in various organic solvents and their stability was evaluated. The results are shown in Table 6.

TABLE 6

(Examples 13–14) Stability of Dispersion Of Oxidized polyethylene coated Copper Phthalacyanine Blue pigment washed with n-propanol

| Oxidized Poly ethylene (weight percent) | With or Without Resins | Ethanol | MEK | Toluene | Soy Oil |
|---|---|---|---|---|---|
| AC 656 (4 wt. %) | With Resins | VP | P | E | E |
| AC 316 (4 wt. %) | Without Resins | VP | VP | E | E |
| Control* | — | VP | VP | G | P |

*Control, Dry pigment, Sunfast Blue 2492083 from Sun Chemical

The oxidized polyethylene has low polarity and low hydrophilic property. Therefore the stability of the dispersions were poor in ethanol and methyl ethyl ketone (MEK). On the other hand, less polar solvents, such as toluene and soy oil, suspended the pigments very well.

Examples 15–16

Evaluation of washing solvent for surface coated Carbon Black with/without resins in oil(s) based on the section "Surface Coating Procedures", 1-B and 1-A Oxidized polyethylene coated, dry carbon black pigments were prepared in accordance with general procedures 1-B and 1-A, in which 4 weight percent of AC 6702 or AC 316 oxidized polyethylene was used, with or without additional resins, respectively, in linseed oil or soy oil. The resins used were a mixture of resins, Pentrex 859HV (phenol modified ester of rosin) and Acryloid-R DM-55 (acrylic resin), at a weight ratio of 4:1 respectively. The particles were washed with various solvents, and dried, to obtain dry, coated carbon black pigment particles. The dry, coated particles were evaluated with respect to particle size. Table 7 shows the results on the particle size distribution for the carbon black, Elftex-8, coated with the use of auxiliary resins, in addition to the oxidized polyethylene.

TABLE 7

(Example 15) Washing Solvent Dependency - AC 6702 (4 wt. %) coated Carbon Black, Elftex-8, with resins in aged linseed oil

| Solvent | Median Diameter (micrometer) | Standard Deviation (micrometer) | Remarks |
|---|---|---|---|
| Isoper G | 0.767 | 0.311 | Broad |
| Ethyl Acetate | 0.249 | 0.298 | Bimodal |
| n-Propanol | 0.339 | 0.320 | Bimodal |
| Hexane | 0.325 | 0.294 | Bimodal |

The solvents, with the exception of Isoper G, gave similar results with respect to particle size distribution. Table 8 shows the results on the particle size distribution for the carbon black, Monarch 120, coated with the oxidized polyethylene, without the use of auxiliary resins, using the procedure 1-A, in soy oil.

TABLE 8

(Example 16) Washing Solvent Dependency - AC 316 (4 wt. %) coated Carbon Black, Monarch 120, without resins in soy oil

| Solvent | Median Diameter (micrometer) | Standard Deviation (micrometer) | Remarks |
|---|---|---|---|
| Toluene | 0.193 | 2.734 | Trimodal |
| Hexane | 1.363 | 2.909 | Trimodal |
| n-Propanol | 0.196 | 0.303 | A minor peak in Bimodal distribution |

It is obvious that n-propanol was the best of the three solvents evaluated. Therefore, it is possible to make oxidized polyethylene coated dry pigment, which has small enough particle size, from ready-made ink concentrates and oil pastes, by washing with solvents.

Examples 17–20

Stability of dispersion which involves oxidized polyethylene coated dry Carbon Black washed with n-propanol The affinity of dry, coated particles of carbon black made in accordance with the procedures of Examples 16 and 17, washed with n-propanol, was evaluated with respect to several solvents and the results are shown in Table 9.

TABLE 9

(Examples 17–20) Stability of Dispersion Oxidized Polyethylene (4 wt. %) coated dry Carbon Black washed with n-propanol

| Carbon Black | Oxidized Poly ethylene | With or Without Resins | Ethanol | MEK | Toluene | Soy Oil |
|---|---|---|---|---|---|---|
| Elftex 8 | AC 6702 | With Resins | G | G | G | E |
| Elftex-8 | — | — | E | G | VP | G |
| Monarch-120 | AC 316 | Without Resins | G | VP | VP | E |

TABLE 9-continued (Examples 17–20)
Stability of Dispersion
Oxidized Polyethylene (4 wt. %) coated dry Carbon
Black washed with n-propanol

| Carbon Black | Oxidized Polyethylene | With or Without Resins | Ethanol | MEK | Toluene | Soy Oil |
|---|---|---|---|---|---|---|
| Monarch-120 | — | — | E | VP | VP | G |

The resins used were a mixture of resins, Pentrex 859HV (phenol modified ester of rosin) and Acryloid-R DM-55 (acrylic resin), at a weight ratio of 4:1, respectively.

It appears that the coated pigments have similar solvent affinities when compared to the uncoated pigments. This lack of significant difference may be due to the fact that the coating on the pigments may not be complete, causing bare surfaces to remain exposed.

Examples 21–23
Stability of dispersion of modified polyethylene coated, dry Copper Phthalocyanine made in accordance with Procedures No. 2 Using an Organic Solvent and Water As the Medium for performing the coating Copper Phthalocyanine Blue presscake from Magruder was used as the pigment source. AC 656 modified polyethylene and AC 400 ethylene-vinyl acetate copolymer was used as the coating polymers. The resulting dry, coated pigment particles were evaluated with respect to their stability in various solvents. The results are shown in Table 10.

TABLE 10

(Examples 21–23) Stability of
Dispersion Modified polyethylene coated
Copper Phthalocyanine Blue
in mixture of Xylenes and Water

| Modified Polyethylene (weight percent) | Ethanol | MEK | Toluene | Soy Oil |
|---|---|---|---|---|
| AC 656 (9.1%) | G | VP | G | E |
| AC 656 (4 wt. %) | P | VP | G | E |
| AC 400 (4 wt. %) | VP | VP | VP | E |
| Control* | VP | VP | P | G |

*Control, It was prepared from the presscake by air-drying overnight or 3 days at room temperature.

It is apparent that the polymer treatments enhanced the stability of the dispersions in toluene and soy oil. It is not unexpected that the treated pigments have poor stability in the polar solvents, such as ethanol and methyl ethyl ketone (MEK) because of the hydrophobicity of the coating materials, when compared to the nature of the untreated pigment.

Examples 24–26
Stability of dispersion of oxidized polyethylene coated, dry Copper Phthalocyanine Blue made in accordance with Procedure Nos. 2 and 3-A Copper Phthalocyanine Blue was coated with oxidized polyethylene. In accordance with Procedure No. 2, the coating medium is a mixture of organic solvent (xylene) and water. In accordance with Procedure 3-A, the coating medium is water. The polyethylene coating polymer was AC 656 or AC 6702 oxidized polyethylene. Table 11 shows the stability of the resulting treated pigments, in various solvents.

TABLE 11

(Examples 24–26) Stability of
Dispersion Oxidized polyethylene coated
Copper Phthalocyanine Blue processed in
water and mixture of xylene and water

| Coating Material (weight percent) | Processing Environment | Ethanol | MEK | Toluene | Soy Oil |
|---|---|---|---|---|---|
| AC 656 (4 wt. %) | Xylene and Water | P | VP | G | E |
| AC 6702 (4 wt. %) | Water | VP | VP | P | E |
| Control* | — | VP | VP | P | G |

*Control, See Table 10.

The coated pigments showed excellent dispersibility in soy oil.

Examples 27–30
Stability of dispersion of oxidized polyethylene coated, dry Lithol Rubine made in accordance with Procedures Nos. 2 and 3-A Lithol Rubine has a high hydrophilic surface character. The pigment was treated in accordance with Procedure Nos. 2 and 3-A, using an organic solvent/water medium and an aqueous medium, respectively. The chemical resistance of the coated pigments was tested in acid and alkaline solution and the results are shown in Table 12.

TABLE 12

(Examples 27–30) Stability of
Dispersion and Chemical Resistance Oxidized
polyethylene (AC 6702) coated Lithol Rubine
processed in water and mixture of xylene and water

| Oxidized PE (wt. %) | Processing Environment | EtOH | MEK | Toluene | Soy Oil | Acid pH 4.64 | Alkaline pH 11 |
|---|---|---|---|---|---|---|---|
| 4 | Xylene and Water | VP | E | VP | G | Bleeding | Light Bleeding |
| 4 | Water | VP | VP | P | G | Bleeding | Bleeding |
| 6 | Water | VP | VP | G | G | No Bleeding | Bleeding |
| 8 | Water | VP | VP | G | G | Bleeding | Bleeding |
| 0* | — | VP | VP | P | G | Bleeding | Bleeding |

*Control, prepared from the presscake by air-drying overnight or 3 days at room temperature.
OxiPE: Oxidized polyethylene Higher loading of the oxidized polyethylene on the pigment resulted in an increase in the stability of the pigment in toluene in comparison to the nontreated (0 wt. %) pigment. It was unexpected that only the pigment coated with 6 weight percent of the oxidized polyethylene showed no bleeding in the acid solution.

The chemical resistance test in an aqueous solution at pH 11 suggested that the procedure of the test may be flawed due to the presence of water soluble Lithol Rubine sodium salt in the pigment. It would be important to wash off any water soluble material before the chemical resistance test especially in vies of the fact that the surface treatment with the oxidized polyethylene was accomplished in water.

Examples 31–32

Stability of dispersion of oxidized polyethylene coated, dry Diarylid Yellow made in accordance with Procedure Nos. 2 and 3-A Diarylid Yellow pigment, which has moderate hydrophilic character, is coated with 4 weight percent of oxidized polyethylene, AC 6702, using Procedure Nos. 2 and 3-A, in organic solvent (xylene)/water and water, respectively. Table 13 shows the stability of the treated pigments in various solvents.

TABLE 13

(Examples 31–32) Stability of Dispersion Oxidized polyethylene (AC 6702, 4 wt. %) coated Diarylid Yellow pigment processed in water and mixture of xylene and water

| Processing Environment | Ethanol | MEK | Toluene | Soy Oil |
| --- | --- | --- | --- | --- |
| Xylene and Water | E | E | G | E |
| Water | VP | VP | P | E |
| Control* | VP | VP | VP | P |

*Control, was prepared from the presscake by air-drying overnight or 3 days at room temperature.

The coated Diarylid Yellow pigments demonstrated a high stability in soy oil in comparison to the untreated pigment (control).

Example 33

Stability of dispersion of oxidized polyethylene coated, dry Carbon Black, Elftex-8, prepared in accordance with Procedure No. 3-B Carbon Black, Elftex-8, dry pigment is polymer coated with oxidized polyethylene, in water, in accordance with Procedure No. 3-B. Table 14 shows the stability of the coated pigment in solvents.

TABLE 14

(Example 33) Stability of Dispersion Oxidized polyethylene (AC 6702) coated Carbon Black, Elftex-8, in water

| Coating Material (weight percent) | Ethanol | MEK | Toluene | Soy Oil |
| --- | --- | --- | --- | --- |
| AC 6702 (4 wt. %) | E | G | VP | G |
| Control* | E | G | VP | G |

*Control, Untreated dry carbon black, Elftex-8, from Cabot.

This test did not show any significant difference between treated and untreated pigments. It appears that the pigment requires more oxidized polyethylene to complete the modification of its surface character because of high surface area.

Examples 34–37

Stability of dispersion of modified polyethylene coated dry Alkali Blue pigment made in accordance with Procedure No. 3-A It is well known that Alkali Blue pigment is highly hydrophilic and ionic. Therefore, it is difficult to disperse the pigment in low polar solvents as well as in vegetable oils, without proper surface treatment. The pigments ionic character causes a "bleeding" problem in an acid fountain solution, if the pigment has a poor surface treatment. The Alkali Blue pigment is treated in accordance with Procedure No. 3-A with AC 6702 oxidized polyethylene, or AC 1702 polyethylene. Table 15 shows the stability of the treated pigment in various solvents, as well as their corresponding chemical resistance.

TABLE 15

(Examples 34–37) Stability of Dispersion and Chemical Resistance of Modified polyethylene coated Alkali Blue pigment in water

| Coating Material (wt. %) | Water | EtOH | MEK | Toluene | Soy Oil | Acid pH 4.64 | Alkaline pH 11 |
| --- | --- | --- | --- | --- | --- | --- | --- |
| AC 6702 (4 wt. %) | VP | E | G | E | E | No Bleeding | No Bleeding |
| AC 6702 (6 wt. %) | VP | E | P | G | P | No Bleeding | No Bleeding |
| AC 1702 (8 wt. %) | VP | E | P | P | G | No Bleeding | No Bleeding |
| Control* | VP | E | P | VP | P | Bleeding | No Bleeding |

*Control was prepared from the presscake by air-drying overnight or 3 days at room temperature.

The high dispersibility of the polymer coated pigments in soy oil and, partially, in toluene is an indication of the success of the surface modification. These coatings eliminated the "bleeding" problem in the acid fountain solution. There were no differences observed, however, between the coated and uncoated pigments with respect to the chemical resistance in the alkaline solution.

Examples 38–40

Detection of coating material on pigment by using $^{13}$C MAS (Magic Angle Spinning) NMR High density oxidized polyethylene (AC 316, 4 wt. %) was coated on Copper Phthalocyanine Blue pigment, without resins, in soy oil, in accordance with Procedure 1-A. The dry pigment from Sun Chemical was used for this experiment. The oil was washed off with n-propanol and the pigment was dried at room temperature. The dried sample displayed a broad peak centered at 32.5 ppm. The reference, AC 316, also displayed a broad signal centered at 32.9 ppm. Accordingly, there was good agreement of their chemical shifts. Therefore, AC 316 exists on the pigment surface after washing with n-propanol.

Oxidized polyethylene (AC 656, 4 wt. %) was coated on Copper Phthalocyanine Blue pigment, in accordance with Procedure 2, in a mixture of xylene and water. The presscake from Magruder was used for this experiment. The AC 316 coated dry pigment showed a weak broad signal between 30.8 ppm and 31.7 ppm. The reference, AC 656, displayed a broad signal centered at 30.8 ppm. Accordingly, there was good agreement of the peaks. Therefore, it is apparent that the coating process was successful in the mixture of xylene and water.

Oxidized polyethylene (AC 6702, 4 wt. %) was coated on Copper Phthalocyanine Blue pigment in water, in accordance with Procedure 3-A. The presscake from Magruder was used for this experiment. The AC 6702 coated dry pigment showed weak peaks around 30 ppm. The reference, AC 6702, displayed broad peaks between 30 ppm and 32.9 ppm. Thus, again there was good agreement of their chemical shifts. Therefore, the coating process for the pigment was completed in water.

Examples 41–42

Evaluation of coated Copper Phthalocyanine Blue which is prepared from presscake for ink application Copper Phthalocyanine Blue coated with AC 6702 oxidized polyethylene is prepared from presscake. AC 6702 was applied on the surface of copper phthalocyanine blue pigment in a slurry form with water. The slurry was reconstituted from its presscake form. The procedure for the surface treatment is 3-A. The resulting coated products were evaluated with respect to color quality. Table 16 shows their color quality as printed heatset inks on sheets of coated stock paper.

TABLE 16

(Examples 41–42) Color Quality of Treated Pigment in Heatset Ink Formula

| Coating Material (weight percent) | AC 6702 (4 wt. %) Pigment Content 15.1 wt. % | Untreated* Pigment Content 16.8 wt. % | Control** Pigment Content 16.8 wt. % |
| --- | --- | --- | --- |
| L | 32.82 | 24.80 | 26.56 |
| a | −15.28 | −8.97 | −10.53 |
| b | −53.66 | −49.10 | −48.61 |
| Gloss at 60 degree | 60.5 | 61.7 | 58.4 |
| Density | 2.53 | 2.60 | 2.38 |

*Untreated pigment, prepared from the presscake by air-drying overnight or 3 days at room temperature.
**Control, Sunfast Blue 2492083 from Sun Chemical It is apparent that the AC 6702 treated pigment demonstrated the best quality based on brightness, strength of blue, degree of green shade and gloss in the three samples.

Table 17 shows the rheological properties of the coated pigments.

TABLE 17

(Examples 41–42) Rheological Properties of Heatset Inks Made from Treated Pigment

| Coating Material (weight percent) | AC 6702 (4 wt. %) Pigment Content 15.1 wt. % | Untreated* Pigment Content 16.8 wt. % | Control** Pigment Content 16.8 wt. % |
| --- | --- | --- | --- |
| Viscosity (poise) | 243 | 317 | 232 |

TABLE 17-continued (Examples 41–42) Rheological Properties of Heatset Inks Made from Treated Pigment

| Coating Material (weight percent) | AC 6702 (4 wt. %) Pigment Content 15.1 wt. % | Untreated* Pigment Content 16.8 wt. % | Control** Pigment Content 16.8 wt. % |
| --- | --- | --- | --- |
| Yield Value (dyne/cm2) | 2066 | 3332 | 2583 |
| Shortness Factor*** | 8.5 | 10.5 | 11.1 |

* and **See Table 16.
***Shortness Factor = (Yield Value/Viscosity)

The oxidized polyethylene coated pigments in the heatset ink formula demonstrated excellent rheological properties, such as the shortness factors around 8.5.

A grinding test of the AC 6702 (4 wt. %) coated pigment with Capsule Softening Vehicle NVFG-380 passed "0,0" by using N.P.I.R.I. Production Grindometer-G-1 after 50 revolutions of mulling with 10 LB weigh by using a Hoover Automatic Muller Model M5.

Example 43

Modification of Alkali Blue Pigment Slurry

Oxidized polyethylene, 5 to 6 weight percent, based on the weight of the pigment, was applied to the pigment surface, in heated water, approximately 70° C., for 20 to 30 minutes, with mixing at 3000 rpm, using the following procedure.

Conversion From Slurry to Presscake

Surface treated Alkali Blue pigment was converted from slurry to presscake form by using common filtration technique and the pigment concentration in the presscake was evaluated by drying it in an oven at 110° C. for overnight to 3 days. The results are shown in Table 18.

TABLE 18

Pigment Concentration in Presscake

| Pigment (Form and Resources) | Pigment Concentration (wt %) in Slurry | Oxidized Polyethylene AC6702 (wt %), in Treated Pigment | Pigment Concentration (wt %) in Presscake |
| --- | --- | --- | --- |
| Treated Alkali Blue (Presscake form and BASF) | 5 | 5 | 22.2 |
| Untreated Alkali Blue (Presscake form and BASF) | N.A. | N.A. | 23.8 |

N.A.: They are commercially available presscakes as controls.

The treated pigment concentration in the presscake is quite similar to that in the untreated presscake as a control. The concentration is dependent upon the efficiency of the filtration process and time.

Flushing of Presscake

The flushing of water from the presscake was carried out in two stages. In the first stage, the presscake is mixed with varnish in a stainless steel container, using stirring at room temperature. Phase separation, from an emulsified condition was observed. The resultant solid or heavy paste was separated from liquid by filtration and the amount of the filtrated liquid was measured to evaluate the efficiency of flushing process. In the second stage, the remaining water in the solid or paste is evaporated under reduced pressure at 40° C., with mixing at 70 rpm. A Ross Mixer was used for the second stage flushing process. The components of the varnish are shown in Table 2.

The mixing ratio of the Alkali Blue presscake to the varnish, with anti-oxidant, is calculated based on 36 parts of pigment in dry weight involved in the presscake, 63 parts of the varnish and 1 part of 10 wt % BTH in Aged Linseed Oil.

The result of the first flushing stage of the presscake with the varnish is shown in Table 19.

TABLE 19

Flushing Efficiency on the First Stage

| Presscake | Eliminated Water from Presscake (wt %) | Time for Flushing Water (min) | Phase Separation |
|---|---|---|---|
| Treated Alkali Blue | 48 | 30 | Clear |
| Untreated Alkali Blue | 42 | 60 | Clear |

The words for presscakes in Table 19 relate to those in Table 18.

The pigment treated in accordance with the present invention demonstrated an emphasized hydrophobic character as shown by the reduction of the flushing time and clarity of the phase separation.

Grinding gage test for the flushed pigments

A grinding test of the treated and untreated pigments in flushed form was carried out by using a grinding gage. Samples were prepared by mixing the flush with a varnish, Capsule Softening Vehicle NVFG-380, from Walsh Manufacturing Company. The results are shown in

TABLE 20

Grinding Gage Test of Flushed Pigments

| Flush | Result |
|---|---|
| Treated Alkali Blue | 0.3 |
| Untreated Alkali Blue | 0.5 |
| Commercially Available Alkali Blue From BASF, R61SR1116 | 2.0 |

Heatset Ink Formulation and Printing

Heatset inks were formulated by mixing the pigments with a heatset let-down varnish in a ratio of 42/58 (Flush/Varnish) by weight. Table 21 shows a formulation for the let-down varnish.

TABLE 21

Formulation of Heatset Ink Let-Down Varnish

| Ingredients | Weight Percent |
|---|---|
| Exoset HS-126G (with M47 Oil)* | 69.0 |
| Exoset QS 128FF* | 12.0 |
| Capsule Softening Vehicle NVFG-380* | 5.2 |
| Exoset FF Varnish X-200-82A* | 12.0 |
| COVI-OX T-70 from Henkel Corp. | 1.8 |
| Total | 100.00 |

*They are from Walsh Manufacturing Company.

The inks were printed and evaluated with respect to their printed image quality as well as their rheological properties.

Table 22 shows the properties of the treated and untreated Alkali Blue pigments in the heatset ink formula.

TABLE 22

Properties of Alkali Blue Pigments in Heatset Ink Formula made of Flushes

| Flush | Treated | Untreated | Commercially available from BASF |
|---|---|---|---|
| L | 17.23 | 18.80 | 19.58 |
| a | 21.52 | 20.69 | 15.97 |
| b | −81.67 | −82.17 | −72.61 |
| Gloss at 60 degree | 61.6 | 57.7 | 46.8 |
| Density | 2.37 | 2.29 | 2.05 |
| Viscosity (poise) | 544 | 503 | 308 |
| Yield Value (dyne/cm2) | 8839 | 10857 | 5242 |
| Shortness Factor (Viscosity/Yield Value) | 16.2 | 21.6 | 17.0 |

The treated pigment generated deep color with high gloss as well as low shortness factor, as compared with the untreated pigment, and the commercially available pigment in flush form.

Chemical Rresistance of the Treated Pigment

A water pick-up test of the heatset inks was carried out by using an acid fountain solution (pH 3.5) to evaluate efficiency of the surface treatment of the pigment. Table 23 shows the result of the water pick-up test.

TABLE 23

Water Pick-Up Test of Alkali Blue Heatset Ink
Fountain Solution: pH 3.5 Absorbed Fountain Solution by Ink (%) in 2 min., 6 min. and 10 min.

| Flush for Heatset Ink | 2 min | 6 min | 10 min | Bleeding |
|---|---|---|---|---|
| Treated Alkali Blue | 37.2 | 42.2 | 44.2 | NO |
| Untreated Alkali Blue | 35.6 | 42.4 | 43.2 | NO |
| Commercially Available Alkali Blue from BASF | 35.0 | 44.8 | 48.6 | YES |

The treated and untreated Alkali Blue pigments were stable in the acidic fountain solution. On the other hand the commercially available Alkali Blue flush from BASF was not as protected from the fountain solution. Surprisingly, both the treated and untreated pigments did not show significant difference. The particular varnish formulated (See Table 2) to flush the presscakes provides significant protection to the surface of the pigments.

Another chemical resistance test of the pigments was performed by using an alkaline fountain solution (pH 9.98). The pigment samples were mixed with the alkaline fountain solution in 2.0 ml glass vials and were sonicated for 5 minutes. The color of the supernatant, such as colorless or blue, which is indicative of the chemical resistance, was evaluated. See Table 24.

TABLE 24

Chemical Resistance of Alkali Blue in Alkaline Fountain Solution pH 9.98

| Pigment | Color of Supernatant |
|---|---|
| Treated Alkali Blue in dry form | Colorless |
| Treated Alkali Blue in presscake form | Colorless |
| Untreated Alkali Blue in presscake form | Blue |

The surface treatment for the pigment provided additional chemical resistance to the alkaline solution.

What is claimed is:

1. A method for making coating pigment particles, said method comprising forming a suspension of the desired pigment particles in a medium that also comprises an olefinic polymer, allowing the suspension of pigment particles to contact said polymer at a temperature above the softening point of the polymer, coating the particles with the polymer by allowing the resultant suspension to cool to a temperature below the solidification temperature for the polymer while maintaining the pigment particles in suspension, removing the medium from the surface of the particles and recovering dry, polymer-coated pigment particles from the suspension.

2. The method of claim 1 wherein the medium is an oil, the oil is removed by washing with a volatile solvent, and the wasted particles are dried.

3. The method of claim 1 wherein the pigment particles are coated with said polymer as a suspension in a medium that comprises an organic solvent, and the solvent that is used to form the suspension is removed directly by drying.

4. The method of claim 1 wherein the pigment particles are coated with said polymer as a suspension in a medium that comprises an organic solvent, and the solvent that is used to form the suspension is replaced by solvent washing with a more volatile solvent that is subsequently removed by drying.

5. The method of claim 1 wherein the pigment particles are coated with said polymer as a suspension in water and subsequently the water is removed directly by drying.

6. The method of claim 1 wherein the pigment particles are coated with said polymer as a suspension in water and subsequently the water is replaced by solvent washing with a more volatile solvent that is then removed by drying.

7. The method of claim 1 wherein the medium also comprises a binder resin.

* * * * *